(12) United States Patent
Rahamim et al.

(10) Patent No.: US 6,908,009 B2
(45) Date of Patent: Jun. 21, 2005

(54) HANDHELD APPARATUS FOR SEMI-AUTOMATICALLY FEEDING AND INSERTING MEMBERS INTO BRAILLE SIGNS

(76) Inventors: Reuven Rahamim, 4248 Basswood Rd., St. Louis Park, MN (US) 55416; David F. Birch, 2020 NE. 3rd St., Minneapolis, MN (US) 55418

( * ) Notice: Subject to any disclaimer, the term of this patent is extended or adjusted under 35 U.S.C. 154(b) by 166 days.

(21) Appl. No.: 10/613,194

(22) Filed: Jul. 3, 2003

(65) Prior Publication Data

US 2005/0000927 A1 Jan. 6, 2005

(51) Int. Cl.⁷ .............................................. B65H 1/08
(52) U.S. Cl. ...................................... 221/232; 434/113
(58) Field of Search ................................ 221/232, 233, 221/238, 268, 270; 434/113, 112, 115; 400/109, 109.1

(56) References Cited

U.S. PATENT DOCUMENTS 6,537,071 B2   3/2003  Rahamim

*Primary Examiner*—Kenneth Noland
(74) *Attorney, Agent, or Firm*—Severson, Sheldon, Dougherty & Molenda, P.A.; Gary L. Huusko

(57) ABSTRACT

An apparatus is disclosed for semi-automatically feeding and inserting spherically and non-spherically shaped members into pre-drilled holes on an architectural sign face corresponding to the pattern of Braille letters designed to be formed in the sign. A device is disclosed for holding a reservoir of spherically or non-spherically shaped members, delivering the members from the cylindrical storage tube to a delivery end whereby the member is forcibly inserted into the pre-drilled hole on the sign face by pressure from the user in an arrangement desired for accurately duplicating Braille letters.

6 Claims, 2 Drawing Sheets

HANDHELD APPARATUS FOR SEMI-AUTOMATICALLY FEEDING AND INSERTING MEMBERS INTO BRAILLE SIGNS

DESCRIPTION

The present invention relates generally to a handheld apparatus in the general shape of a pen for semi-automatically feeding and inserting members, both spherical and non-spherical, such as ball bearings and elongated members with a rounded tip, respectively, into pre-drilled holes to form Braille letters on architectural and other signs.

BACKGROUND ART

Signs in buildings that direct people from place to place or identify locations sometimes have a message both in print, to be read by sighted people, and in Braille to be read by blind people. There has been a general trend toward putting Braille on signs, but this trend has been greatly accelerated because of federal legislation requiring that Braille be placed on architectural signs, both new and old.

There is disclosed in U.S. Pat. Nos. 5,245,744 and 5,403,189 a method and apparatus for placing spherically shaped members into holes on sign faces to form Braille letters. Those patents, however, required a cumbersome manual pick-up and insertion of each member into a hole, which was time consuming, labor intensive and inefficient. The present invention semi-automates that process, thereby allowing for increased productivity and savings of both time and labor cost.

Accordingly, there is a need for an easy-to-use handheld apparatus for applying Braille to a sign face that overcomes the aforementioned problems.

DISCLOSURE OF THE INVENTION

The present invention relates to a handheld apparatus in the general shape of a pen for semi-automatically feeding and inserting members, both spherical and non-spherical, into pre-drilled holes thereby creating Braille letters or cells on an architectural or other sign face.

A device is disclosed for storing and semi-automatically feeding and inserting spherically and non-spherically shaped members or the like into pre-drilled holes formed in a sign face, whereby Braille letters are formed in the sign face.

An object of the present invention is to provide an improved, easy-to-hold apparatus for placing Braille letters on an architectural sign face.

Another object of the present invention is to provide an apparatus for placing Braille letters on an architectural sign face which is inexpensive and which is simple to use.

A still further object of the present invention is to provide an apparatus for economically, easily, quickly and dependably inserting spherically and non-spherically shaped members or the like into holes in a sign face for making Braille signs.

A still further object of the present invention is to provide a simple, semi-automatic and dependable apparatus for inserting spherically and non-spherically shaped members into the holes formed in the sign face by the aforementioned apparatus.

Other objects, advantages, and novel features of the present invention will become apparent from the following detailed description of the invention when considered in conjunction with the accompanying drawings.

DETAILED DESCRIPTION OF DRAWINGS AND BEST MODE FOR CARRYING OUT THE INVENTION

Figure 1:
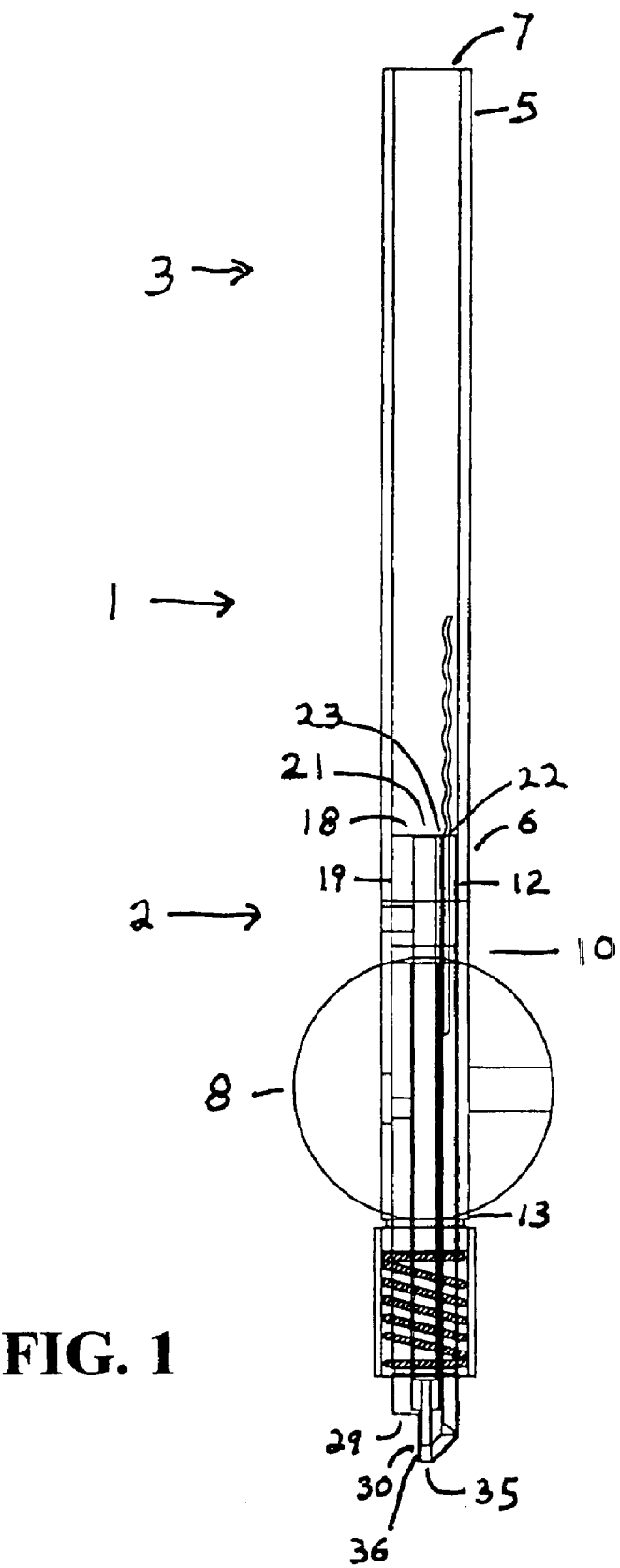
FIG. 1 is a cut-away side view of an apparatus constructed in accordance with the present invention.

Referring now to the drawings wherein like reference numerals designate identical or corresponding parts throughout the several views, FIG. 1 shows a handheld apparatus constructed in accordance with the present invention for semi-automatically feeding and inserting spherically and non-spherically shaped members or the like into pre-drilled holes in a sign face in a pattern corresponding to Braille letters to produce a sign face with Braille lettering in addition to the normal printed lettering.

The apparatus shown in FIG. 1 includes a body 1 having a lower portion 2 and an upper portion 3, said upper portion 3 being comprised of a hollow cylindrical storage tube 4, said cylindrical storage tube 4 having an upper end 5 and a lower end 6, and a cap 7 situated on the upper end 5 of the cylindrical storage tube 4. The hollow cylindrical storage tube 4 holds a plurality of spherically or non-spherically shaped members such as ball bearing members or the like. The spherically and non-spherically shaped members would preferably be made out of acrylic, however, other materials would work equally as well.

Referring now to FIG. 1, the lower portion 2 of the body 1 is comprised of a grip 8 and a tip assembly 9, the grip 8 being fixedly attached and superimposed around the tip assembly 9. The tip assembly 9 is comprised of the outer tube 10 and the inner member delivery device 11. The outer tube 10 is comprised of a top end 12, a bottom end 13, an outer wall 14 having a first diameter 15, an inner bore 16 having a second diameter 17, and an upper closed face 18 at the top end 12. The top end 12 has an attaching area 19 with a third diameter 20 that is smaller than the first diameter 15. The hollow cylindrical storage tube 4 fits over the third diameter 20 of the outer wall 14 of the outer tube 10 of the tip assembly 9 and is affixed thereto with glue or some other such adhesive. The upper closed face 18, having a center hole 21, a wire retainer hole 22 and a delivery tube hole 23, is thus situated within the hollow cylindrical storage tube 4. The upper closed face 18 may also be beveled from the center hole 21 to the delivery tube hole 23 to facilitate movement of the spherically and non-spherically shaped members downward from the cylindrical storage tube 4 into the delivery tube hole 23.

Figure 2:
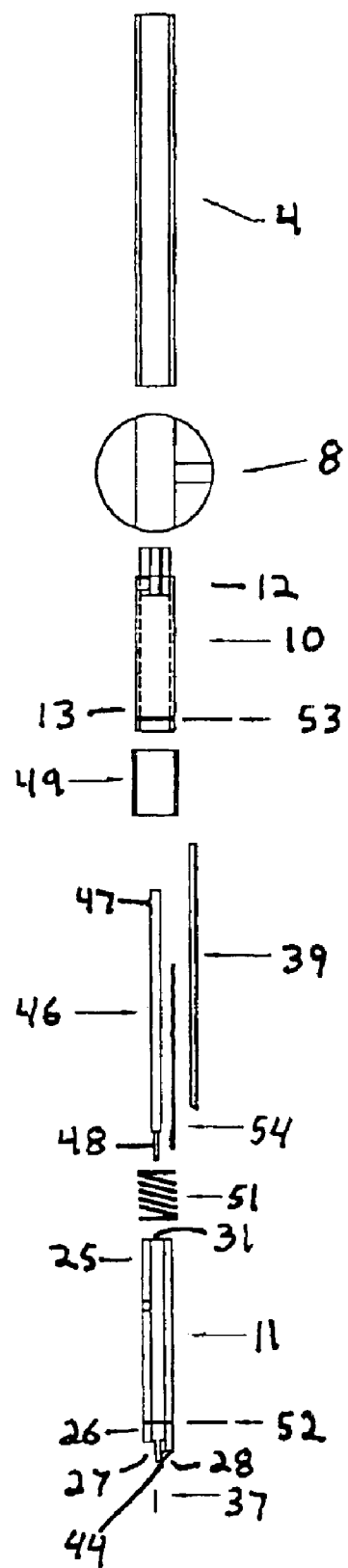
FIG. 2 is an exploded view of the apparatus shown in FIG. 1.

Referring now to FIG. 2, the inner member delivery device 11 is comprised of an outer surface 24, a top portion 25, and a bottom delivery portion 26. The bottom delivery portion 26 is comprised of a cut-out notch 27 and a tapered portion 28 situated at the end of the bottom delivery portion 26 and extending upwards approximately one half the length of the cutout notch 27.

Referring back to FIG. 1, the cutout notch 27 is comprised of a top face 29 and a front face 30.

Referring once again to FIG. 2, a first center bore 31 is disclosed through the center of the inner member delivery device 11 and extends from the top portion 25 to a point approximately one-sixteenth of an inch from the cutout notch 27, the first center bore 31 having a circumference 32, a top aperture 33 and a first center bore bottom portion 34.

The preferred embodiment of the first center bore 31 would disclose a diameter of 0.1560 inches, although that diameter may vary depending upon the desired size of the apparatus.

Referring to FIG. 1, a second center bore 35 extends from the first center bore bottom portion 34 of the first center bore 31 to the bottom delivery portion 26. The preferred embodiment of the second center bore 35 would disclose a diameter of 0.067 inches, although that diameter may vary depending upon the desired size of the apparatus. It is important that the first center bore 31 does not extend through the top face 29 of the cutout notch 27 of the bottom delivery portion 26. The preferred embodiment of the cutout notch 27 of the bottom delivery portion 26 would disclose that the cutout notch 27 extends inward 0.154 inches, thereby forming the top face 29, and extends upward 0.267 inches from the bottom delivery portion 26, thereby forming the front face 30. Again, depending upon the desired size of the apparatus, these measurements may vary.

Said second center bore 35, as it extends along the front face 30 of the cutout notch 27, creates a groove 36 extending along the front face 30. A toe clip 37 is disclosed and fixedly attached to the front face 30 by screws or the like, as shown more clearly in FIG. 2.

The inner member delivery device 11 has a cylindrical groove 38 extending along its outer surface 24, said cylindrical groove 38 having a delivery tube 39 situated therein and fixedly attached therein. The delivery tube 39 comprises an entry end 40 and an exit end 41, said delivery tube 39 extending a sufficient length above said inner member delivery device 11 such that the entry end 40 of the delivery tube 39 is seated below said delivery tube hole 23 of the upper closed face 18 when the apparatus is at rest.

Referring now to FIG. 2, the tapered portion 28 of the bottom delivery portion 26 is comprised of a tapered edge 42 and a lower tapered portion 43, said lower tapered portion 43 having an angled bore 44 extending at an angle upwards and parallel with the tapered edge 42. The exit end 41 of the delivery tube 39 has a cutout embrasure 45 that is aligned with the angled bore 44, thereby allowing a pathway for the spherical and non-spherical members to travel from the cylindrical storage tube 4 to the bottom delivery portion 26.

Referring still to FIG. 2 a main pin 46 having a pin upper portion 47 of a sufficient diameter to fit within the inner bore 16 of the outer tube 10 and slide within the first center bore 31 of the inner member delivery device 11, and a pin lower portion 48 of a sufficient diameter to slide within the second center bore 35 is disclosed and is slidable within the bottom delivery portion 26. The main pin 46 is fixedly attached to the outer tube 10, thereby moving up and down in concert with the movement of the inner member delivery device 11.

Referring still to FIG. 2 outer tube 10 is slidably connected to and disposed around the inner member delivery device 11, thus allowing the inner member delivery device 11 to freely move within a predetermined range up and down within the outer tube 10. The predetermined range can be controlled by various means, as that shown in the preferred embodiment. The preferred embodiment discloses a slot or plurality of slots in the outer tube 10, within which a screw or pin or the like that is fixedly attached to the inner member delivery device 10 can slide.

The bottom end 13 of the outer tube 10 comprises a sleeve 49 fixedly attached and superimposed around the outer wall 14. The sleeve 49 has an inner diameter 50, essentially equal to the first diameter 15 of the outer wall 14 of the outer tube 10.

A spring 51 is disposed around the inner member delivery device 11 and is prevented from extending lower than a point approximately one-quarter of an inch from the top face 29 of the cutout notch 27 by a stopping means, such as that disclosed in the drawing. The preferred stopping means embodiment discloses a c-clamp 52 positioned within an annular groove about the inner member delivery device 11 and a c-clamp 53 positioned within an annular groove about the outer tube 10, thereby creating stops for the upward and downward motion of the inner member delivery device 11. The spring 51 thereby acts as a compression spring to cause the main pin 46 to move downwards within the inner member delivery device 11, as shown in FIG. 1.

A wire 54 is disclosed, which is seated within the wire retainer hole 22 and extends upward into the cylindrical storage tube 4, thereby contacting the spherically and non-spherically shaped members which creates additional movement to the members, thereby facilitating movement downward into the delivery hole 23.

In operation, in order to practice the invention:

As the operator holds the apparatus, the spherically or non-spherically shaped members held in the hollow cylindrical storage tube 4 sequentially drop into the delivery hole 23 of the upper closed face 18 and travel down the delivery tube 39, the downward motion aided by gravity and the wire 54, and each spherically or non-spherically shaped member then continues to travel through the delivery tube 39 at which time the spherically or non-spherically shaped member enters the angled bore 44 and continues down the angled bore 44, at which time the spherically or non-spherically shaped member is stopped by contacting the toe clip 37. The continued downward movement of the apparatus by the operator causes the bottom delivery portion 26 to contact the sign face, thereby compressing the spring 51 which pushes the inner member delivery device 11 upwards, causing the main pin 46 to slide down, whereby the spherically or non-spherically shaped member, being held by the toe clip 37, is then pressed into the hole on the sign face by the main pin 46 as the apparatus continues its downward movement. The continued downward movement causes the main pin 46 to push the member free of the toe clip 37 and into the pre-drilled hole. The main pin 46 then acts as a valve to prevent the next or subsequent member from exiting the angled bore 44.

The preferred embodiment of the invention would include the following measurements, said first diameter of 0.50 inches, said second diameter of 0.375 inches, and said third diameter of 0.375 inches, said center hole having a diameter of 0.125 inches and an inclined edge, said delivery tube hole having a diameter of 0.095 inches, said tapered portion of the bottom delivery portion extending upwards 0.15 inches, said delivery tube having a length of 3.375 inches and diameter of 0.070 inches, said angled bore of the lower tapered portion having a diameter of 0.070 inches, and said main pin of 3.4806 inches in length, although, as shown herein, other sizes and measurements may be used, depending upon the size of the apparatus that the user desires.

Accordingly, it will be appreciated that the present invention does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. A handheld apparatus for semi-automatically feeding and inserting members into pre-drilled holes depicting Braille letters on a sign face comprising:

a body having a lower portion and an upper portion, said upper portion comprising a hollow cylindrical storage tube, said cylindrical storage tube having an upper end and a lower end, and a cap situated on the upper end of the cylindrical storage tube;

the lower portion of the body is comprised of a grip and a tip assembly, the grip being fixedly attached and superimposed around the tip assembly, said tip assembly comprising an outer tube and an inner member delivery device;

said outer tube comprising a top end, a bottom end, an outer wall having a first diameter, an inner bore having a second diameter, and an upper closed face at the top end, said top end having an attaching area comprising a third diameter that is smaller than the first diameter;

said hollow cylindrical storage tube fitting over the third diameter of the outer wall of the outer tube of the tip assembly and affixed thereto with glue or some other such adhesive;

the upper closed face further comprising a center hole and an inclined edge, said inclined edge having a delivery tube hole, is thus situated within the hollow cylindrical storage tube;

the upper closed face further comprising a wire retainer hole and a wire fixedly seated within said wire retainer hole;

said inner member delivery device comprising an outer surface, a top portion, and a bottom delivery portion, the bottom delivery portion comprising a cut-out notch and a tapered portion extending upwards approximately one half the length of the cutout notch, said cut-out notch comprising a top face and a front face;

a first center bore disclosed through the inner member delivery device and extending from the top portion to a point approximately one-sixteenth of an inch from the cutout notch, the first center bore having a circumference, a top aperture and a first center bore bottom portion;

a second center bore extending from the first center bore bottom portion of the first center bore to the bottom delivery portion;

said second center bore creating a groove as it extends along the front face of the cutout notch;

a toe clip fixedly attached to the front face by screws or the like;

said inner member delivery device further comprising a cylindrical groove extending along the outer surface, said cylindrical groove having a delivery tube situated therein and fixedly attached therein, said delivery tube comprising an entry end and an exit end, said delivery tube extending a sufficient length above said inner member delivery device such that the entry end of the delivery tube is seated below said delivery tube hole of the inclined edge of the upper closed face when the apparatus is at rest;

the tapered portion of the bottom delivery portion comprising a tapered edge and a lower tapered portion, said lower tapered portion having an angled bore extending at an angle upwards and parallel with the tapered edge, said exit end of the delivery tube having a cutout embrasure that is aligned with the angled bore, thereby allowing a pathway for the spherical and non-spherical members to travel from the cylindrical storage tube to the bottom delivery portion;

a main pin fixedly attached to the outer tube, having a pin upper portion of a sufficient diameter to fit within the inner bore of the outer tube and slide within the first center bore of the inner member delivery device, and a pin lower portion of a sufficient diameter to slide within the second center bore, thereby moving up and down in concert with the movement of the inner member delivery device;

said outer tube being slidably connected to and disposed around the inner member delivery device, thus allowing the inner member delivery device to freely move within a predetermined range up and down within the outer tube;

the bottom end of the outer tube further comprising a sleeve, fixedly attached and superimposed around the outer wall, said sleeve having an inner diameter essentially equal to the first diameter of the outer wall of the outer tube;

a spring disposed around the inner member delivery device, said spring being prevented from extending lower than a point approximately one-quarter of an inch from the top face of the cutout notch by a stopping means, thereby acting as a compression spring thereby causing the main pin to move downwards within the inner member delivery device;

whereby the members are held in the hollow cylindrical storage tube and sequentially drop into the delivery hole on the inclined edge of the upper closed face and travel down the delivery tube, the downward motion aided by gravity, and each spherically or non-spherically shaped member continuing to travel through the delivery tube, entering the angled bore and continuing down the angled bore, at which time the spherically or non-spherically shaped member is stopped by contacting the toe clip, the continued downward movement of the apparatus by the operator causing the bottom delivery portion to contact the sign face, thereby compressing the spring which pushes the inner member delivery device upwards, causing the main pin to slide down, whereby the spherically or non-spherically shaped member, being held by the toe clip, is then pressed into the hole on the sign face by the main pin as the apparatus continues its downward movement, the continued downward movement causes the main pin to push the member free of the toe clip and into the pre-drilled hole, the main pin then acting as a valve to prevent the next or subsequent member from exiting the angled bore.

2. The apparatus of claim 1 wherein the members are spherically shaped.

3. The apparatus of claim 1 wherein the members are non-spherically shaped.

4. A handheld apparatus for semi-automatically feeding and inserting members into pre-drilled holes depicting Braille letters on an architectural sign face comprising:

a body having a lower portion and an upper portion, said upper portion comprising a hollow cylindrical storage tube, said cylindrical storage tube having an upper end and a lower end, and a cap situated on the upper end of the cylindrical storage tube;

the lower portion of the body is comprised of a grip and a tip assembly, the grip being fixedly attached and superimposed around the tip assembly, said tip assembly comprising an outer tube and an inner member delivery device;

said outer tube comprising a top end, a bottom end, an outer wall having a first diameter of 0.50 inches, an inner bore having a second diameter of 0.375 inches, and an upper closed face at the top end, said top end having an attaching area comprising a third diameter of 0.375 inches;

said hollow cylindrical storage tube fitting over the third diameter of the outer wall of the outer tube of the tip assembly and affixed thereto with glue or some other such adhesive;

the upper closed face further comprising a center hole of 0.125 inches and an inclined edge, said inclined edge having a delivery tube hole of 0.095 inches, is thus situated within the hollow cylindrical storage tube;

said inner member delivery device comprising an outer surface, a top portion, and a bottom delivery portion, the bottom delivery portion comprising a cut-out notch and a tapered portion extending upwards 0.15 inches, said cut-out notch comprising a top face of 0.154 inches and a front face of 0.297 inches;

a first center bore disclosed through the inner member delivery device and extending from the top portion to a point approximately one-sixteenth of an inch from the cutout notch, the first center bore having a circumference of 0.156 inches, a top aperture and a first center bore bottom portion;

a second center bore having a diameter of 0.067 inches extending from the first center bore bottom portion of the first center bore to the bottom delivery portion;

said second center bore creating a groove as it extends along the front face of the cutout notch;

a toe clip fixedly attached to the front face by screws or the like;

said inner member delivery device further comprising a cylindrical groove extending along the outer wall, said cylindrical groove having a delivery tube of 0.07 inches in diameter situated therein and fixedly attached therein, said delivery tube comprising an entry end and an exit end, said delivery tube extending a sufficient length above said inner member delivery device such that the entry end of the delivery tube is seated below said delivery tube hole of the inclined edge of the upper closed face when the apparatus is at rest;

the tapered portion of the bottom delivery portion comprising a tapered edge and a lower tapered portion, said lower tapered portion having an angled bore of 0.07 inches in diameter extending at an angle upwards and parallel with the tapered edge, said exit end of the delivery tube having a cutout embrasure that is aligned with the angled bore, thereby allowing a pathway for the spherical and non-spherical members to travel from the cylindrical storage tube to the bottom delivery portion;

a main pin of approximately 3.4806 inches in length fixedly attached to the outer tube, having a pin upper portion of a sufficient diameter to fit within the inner bore of the outer tube and slide within the first center bore of the inner member delivery device, and a pin lower portion of a sufficient diameter to slide within the second center bore, thereby moving up and down in concert with the movement of the inner member delivery device;

said outer tube being slidably connected to and disposed around the inner member delivery device, thus allowing the inner member delivery device to freely move within a predetermined range up and down within the outer tube;

the bottom end of the outer tube further comprising a sleeve, fixedly attached and superimposed around the outer wall, said sleeve having an inner diameter essentially equal to the first diameter of the outer wall of the outer tube;

a spring disposed around the inner member delivery device, said spring being prevented from extending lower than a point approximately one-quarter of an inch from the top face of the cutout notch by a stopping means, thereby acting as a compression spring thereby causing the main pin to move downwards within the inner member delivery device;

whereby the members are held in the hollow cylindrical storage tube and sequentially drop into the delivery hole on the inclined edge of the upper closed face and travel down the delivery tube, the downward motion aided by gravity, and each spherically or non-spherically shaped member continuing to travel through the delivery tube, entering the angled bore and continuing down the angled bore, at which time the spherically or non-spherically shaped member is stopped by contacting the toe clip, the continued downward movement of the apparatus by the operator causing the bottom delivery portion to contact the sign face, thereby compressing the spring which pushes the inner member delivery device upwards, causing the main pin to slide down, whereby the spherically or non-spherically shaped member, being held by the toe clip, is then pressed into the hole on the sign face by the main pin as the apparatus continues its downward movement, the continued downward movement causes the main pin to push the member free of the toe clip and into the pre-drilled hole, the main pin then acting as a valve to prevent the next or subsequent member from exiting the angled bore.

5. The apparatus of claim 4 wherein the member is spherically shaped.

6. The apparatus of claim 5 wherein the member is non-spherically shaped.

* * * * *